United States Patent
Chen

(10) Patent No.: US 12,395,749 B2
(45) Date of Patent: Aug. 19, 2025

(54) DEVICE FOR IMMERSIVE CAPTURE OF STREAMING VIDEO AND IMAGING AND METHOD THEREOF

(71) Applicant: LIGHT MATRIX INC., Taipei (TW)

(72) Inventor: Wei-Ting Chen, Taipei (TW)

(73) Assignee: LIGHT MATRIX INC., Taipei (TW)

( * ) Notice: Subject to any disclaimer, the term of this patent is extended or adjusted under 35 U.S.C. 154(b) by 74 days.

(21) Appl. No.: 18/216,613

(22) Filed: Jun. 30, 2023

(65) Prior Publication Data

US 2024/0007758 A1    Jan. 4, 2024

(30) Foreign Application Priority Data

Jun. 30, 2022    (TW) .................................. 111124522

(51) Int. Cl.
*H04N 23/90*     (2023.01)
*G06V 10/20*     (2022.01)
*H04N 5/06*      (2006.01)

(52) U.S. Cl.
CPC ........... *H04N 23/90* (2023.01); *G06V 10/255* (2022.01); *H04N 5/06* (2013.01)

(58) Field of Classification Search
None
See application file for complete search history.

(56) References Cited

U.S. PATENT DOCUMENTS

2018/0231375 A1*   8/2018  Wu ........................... G06T 7/55
2020/0382704 A1*  12/2020  Zeng ................... H04N 23/667
2023/0319218 A1*  10/2023  Ren ...................... H04N 5/2624
                                                                382/284

\* cited by examiner

*Primary Examiner* — Eileen M Adams
(74) *Attorney, Agent, or Firm* — Chih Feng Yeh; Yongjean Consulting Inc.

(57) ABSTRACT

A device for immersive capture of streaming video and imaging and a method thereof are disclosed. In the device, a distance parameter is determined based on a detection image captured by a first image capturing unit and having a filming target, rotation angles of the second image capturing units are calculated based on the distance parameter, and unit distances between the second image capturing units and the first image capturing unit, respectively. After the second image capturing units are controlled to rotate based on the rotation angles respectively, a stream combination including the first image stream and the second image streams generated by the first image capturing unit and the second image capturing units in synchronization with each other can be generated, so as to achieve the technical effect of reducing complexity of setting up streaming environment that provides multiple filming angles and reducing trouble for installers.

15 Claims, 9 Drawing Sheets

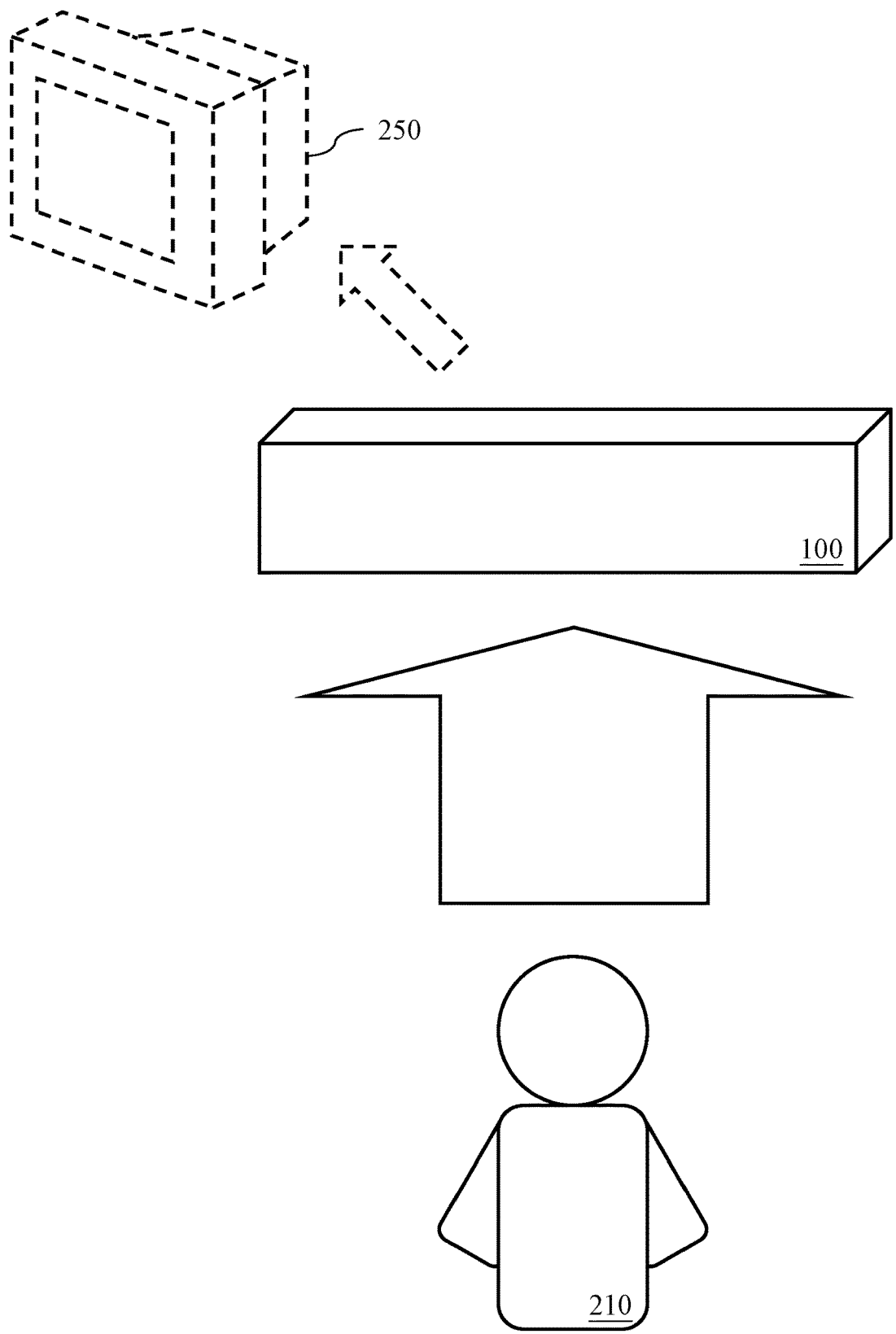
【Fig. 1】

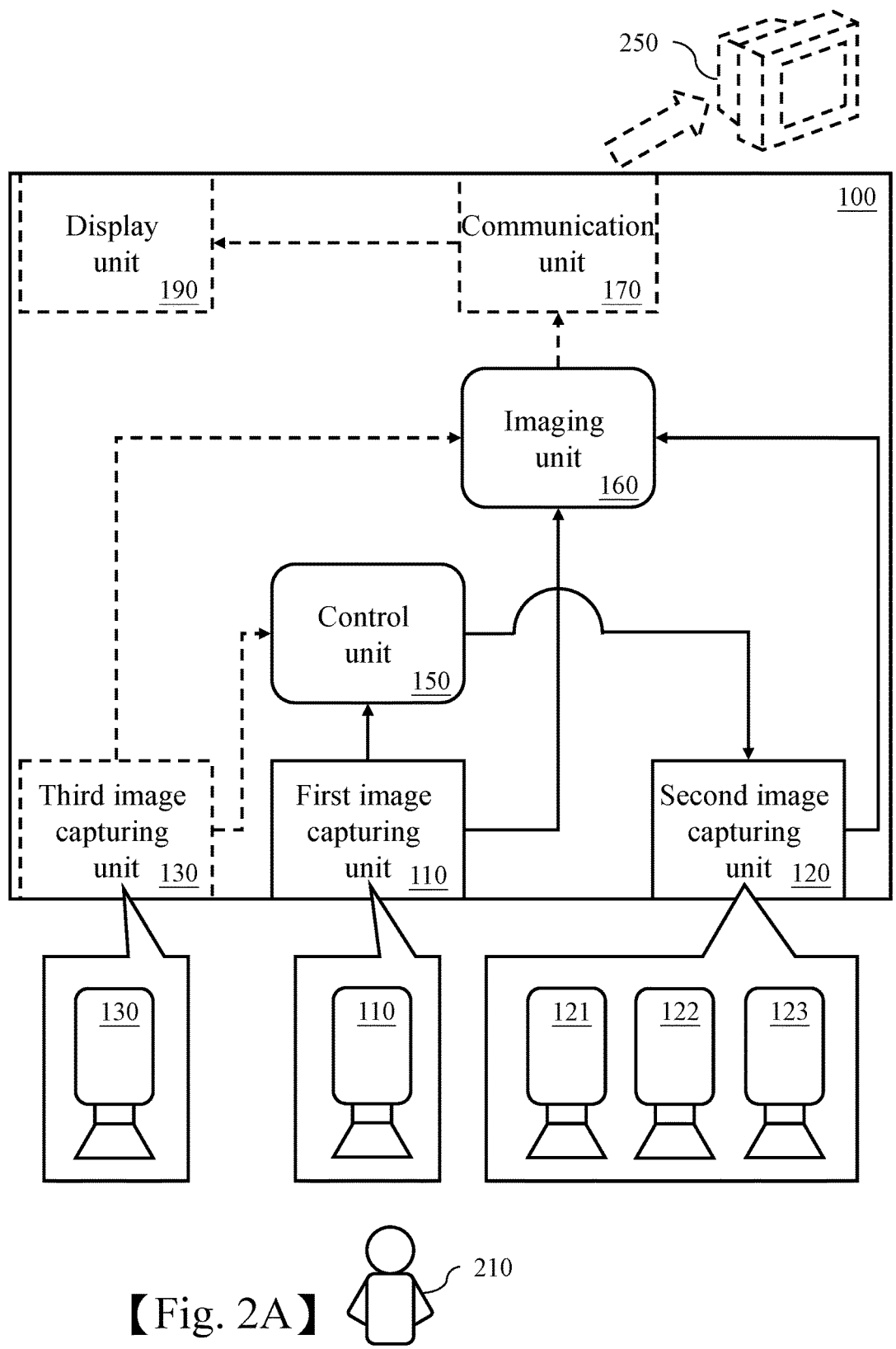
[Fig. 2A]

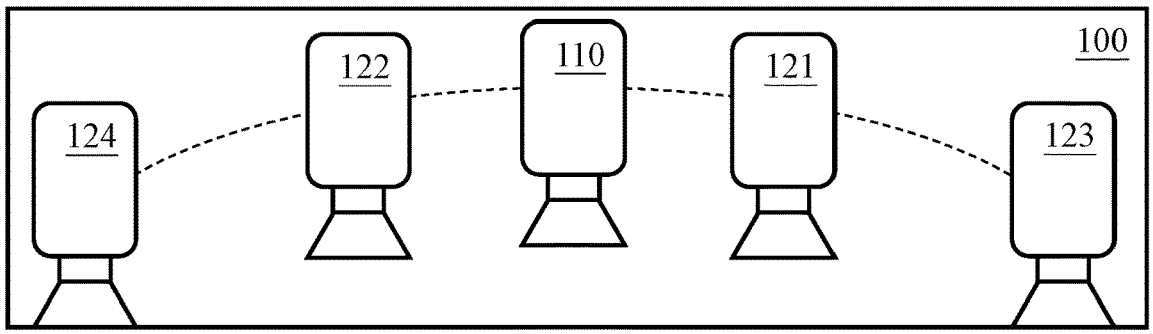
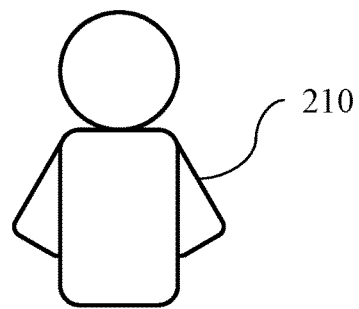
【Fig. 2B】
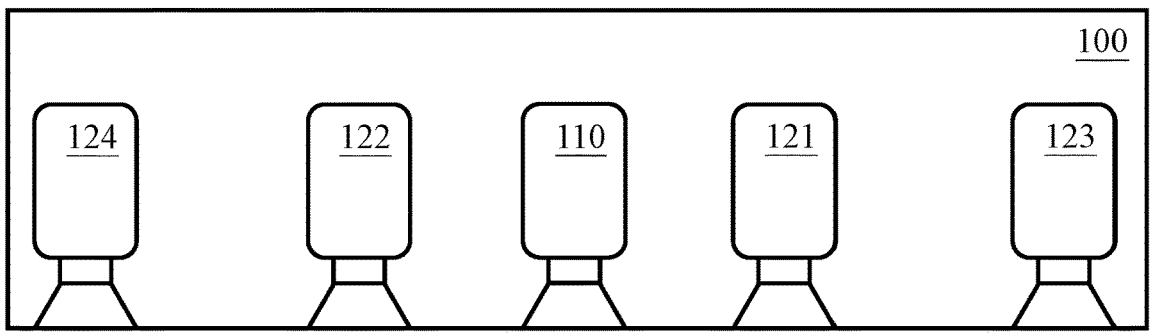
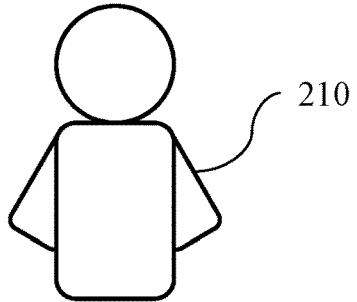
【Fig. 2C】

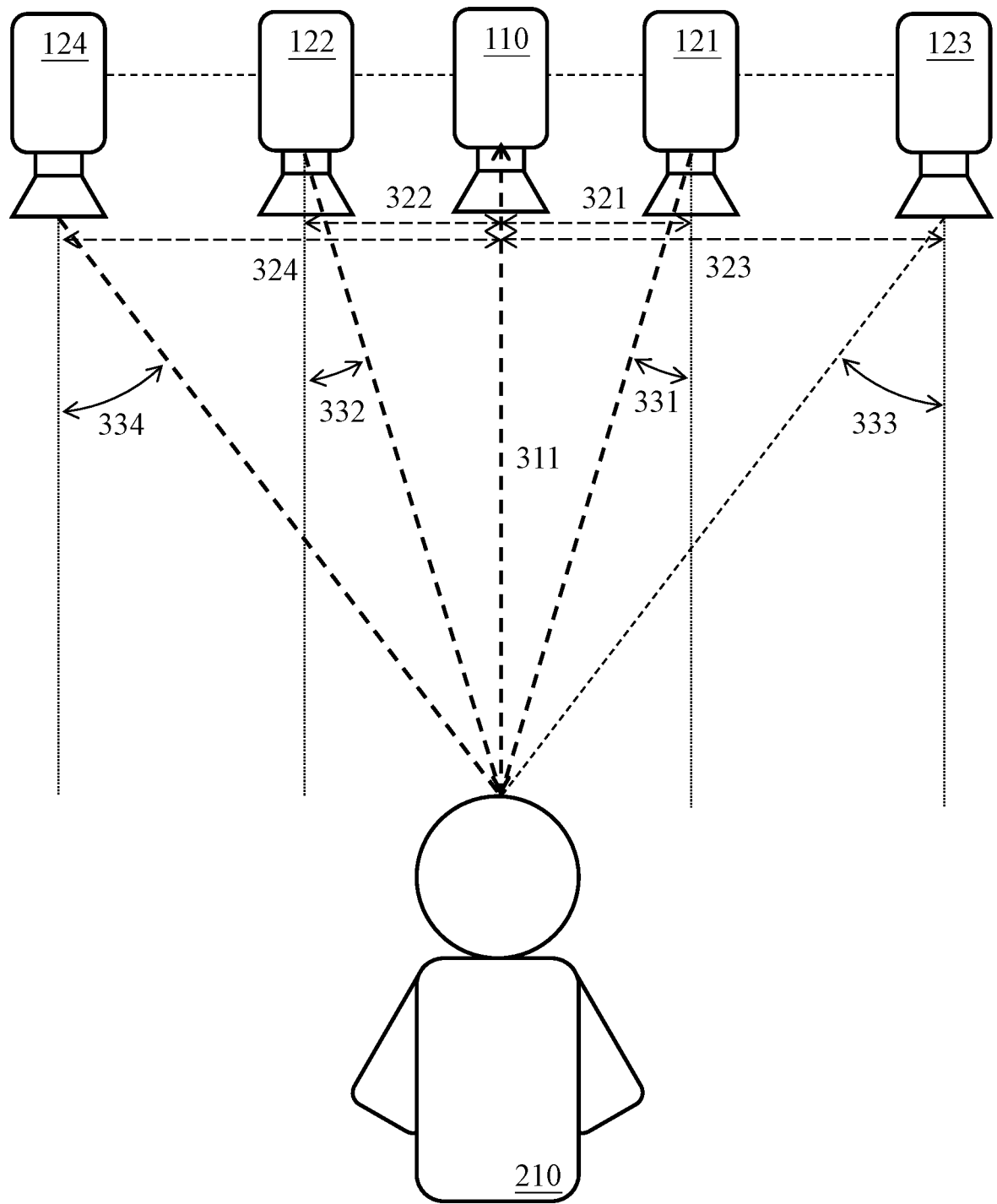
[Fig. 3A]

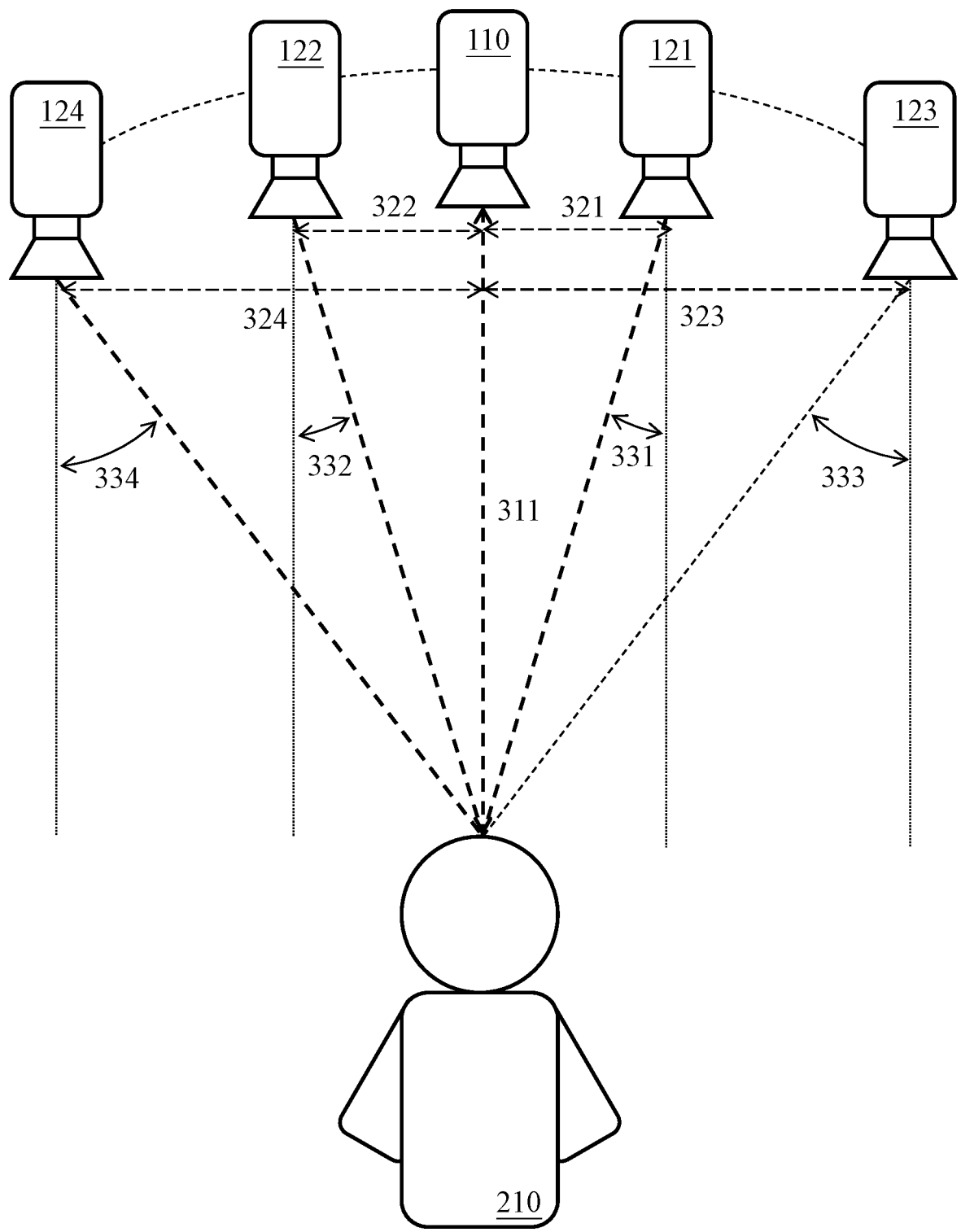
【Fig. 3B】

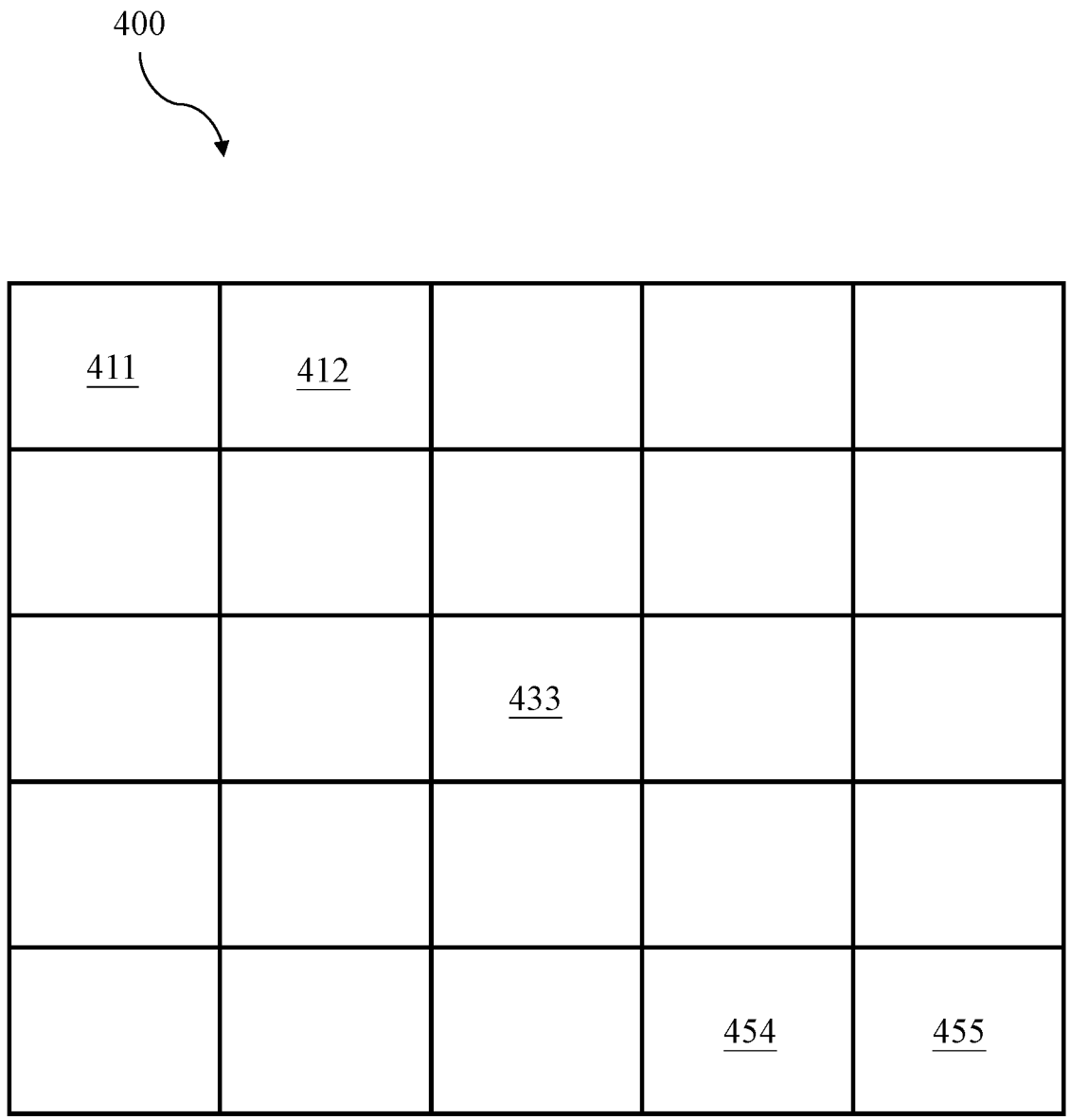
[Fig. 4]

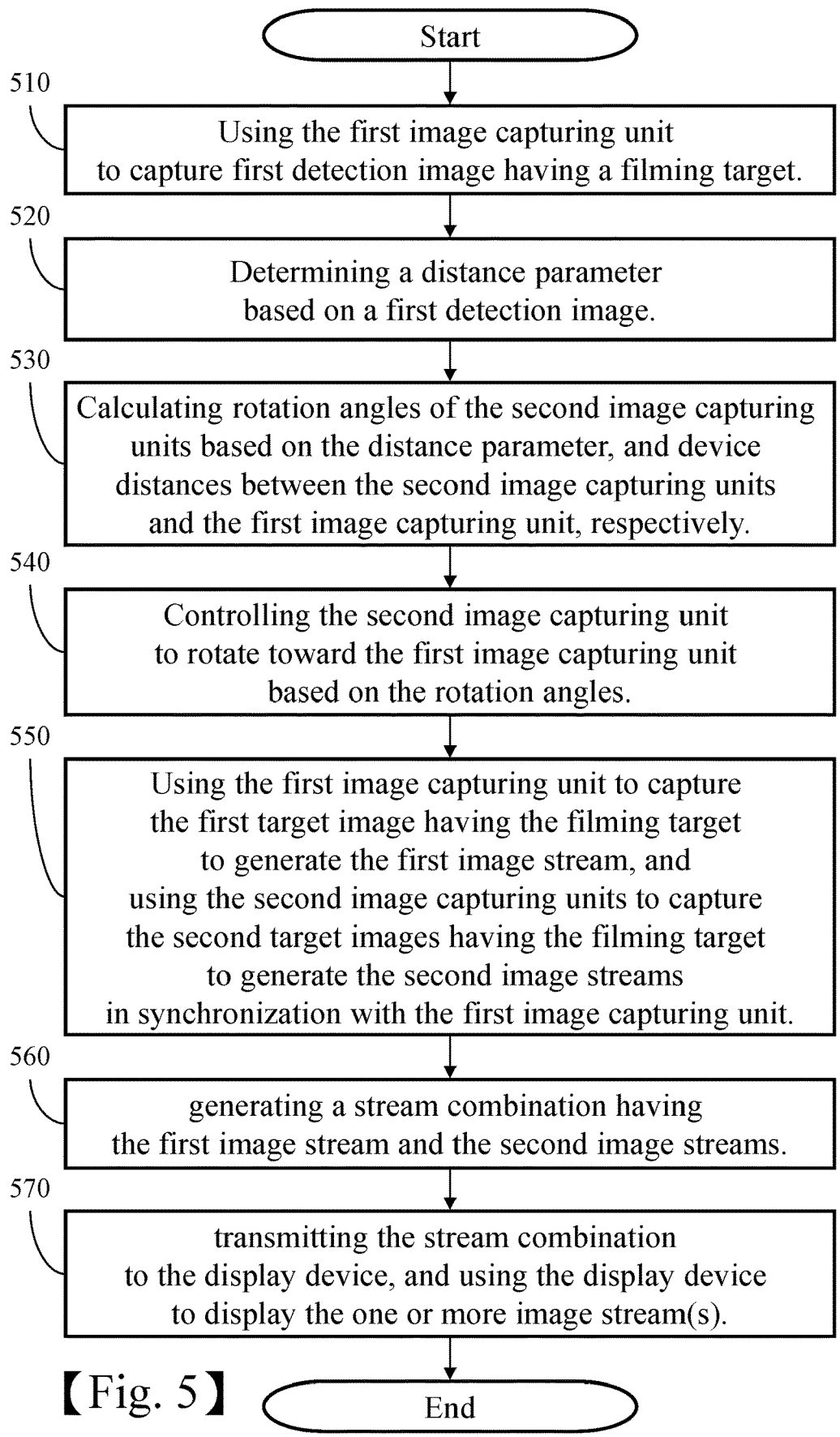
[Fig. 5]

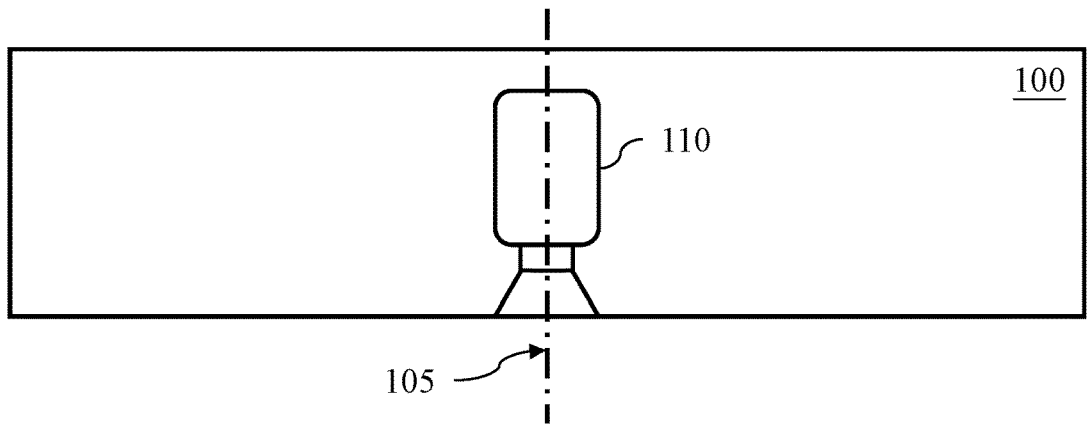
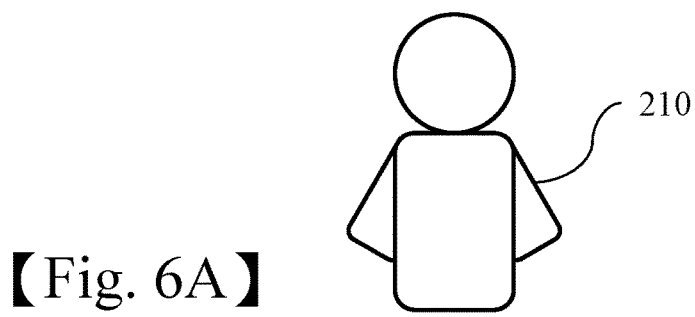
【Fig. 6A】
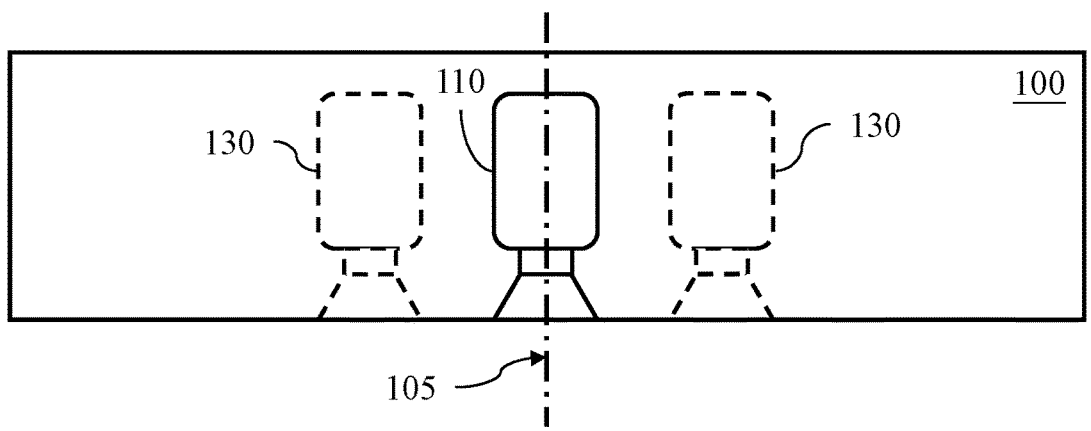
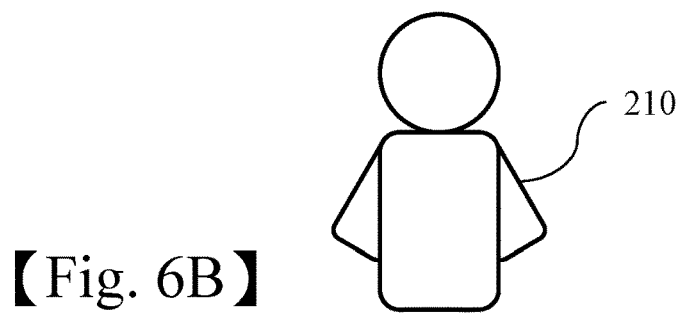
【Fig. 6B】

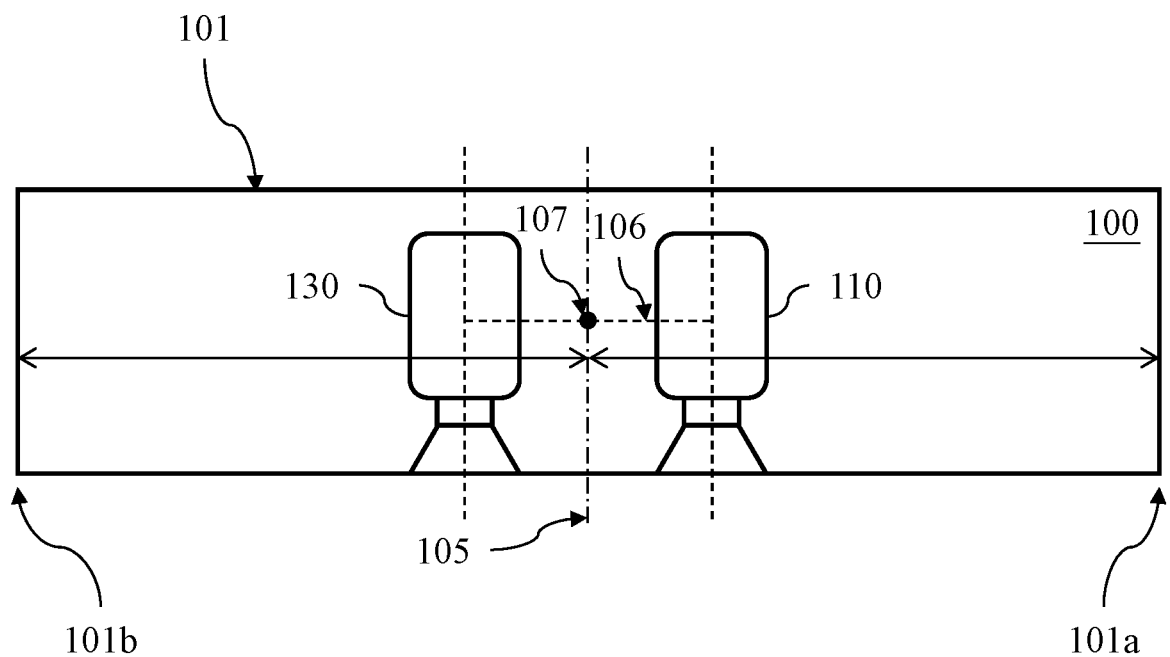
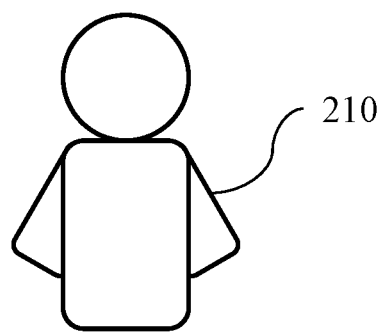
[Fig. 6C]

DEVICE FOR IMMERSIVE CAPTURE OF STREAMING VIDEO AND IMAGING AND METHOD THEREOF

CROSS-REFERENCE STATEMENT

The present application is based on, and claims priority from, TAIWAN Patent Application Serial Number 111124522, filed Jun. 30, 2022, the disclosure of which is hereby incorporated by reference herein in its entirety.

BACKGROUND

1. Field of the Invention

The present invention is related to an image capture and imaging device and a method thereof, particularly to a device for immersive capture of streaming video and imaging and a method thereof.

2. Description of Related Art

With the advancement of hardware technology and the improvement of network bandwidth, the transmission of audio and video content through the Internet is becoming more and more popular. At present, the methods of transmitting multimedia content through the Internet mainly use streaming media or media files. The method using media file is to store the downloaded multimedia content as a file and then play the file, and the method using the streaming media is to download and play the multimedia content simultaneously without saving downloaded multimedia content as a file.

Streaming media is usually used in video-on-demand, Internet TV, video calls, live broadcasts and other occasions, the current environment of video calls and live broadcasts is mostly generated by the caller or live broadcaster by using an image capture device to generate video streaming and transmit the generated video streaming to other callers or live viewers through the Internet. Therefore, during the call or live broadcast, other callers or live viewers can only watch the caller or live viewer from a fixed filming angle. To conduct calls or live broadcasts from multiple different filming angles, the caller or live broadcaster needs to set up multiple image capture devices and use multiple different channels for calls or live broadcasts, and other callers or live broadcast viewers also need to switch channels to view the images from different filming angles. The above-mentioned operations cause complexity and troubles for callers or live broadcasters in setting up call/live broadcast environment, and it is also inconvenient for other callers or live broadcast viewers to switch viewing angles.

According to above-mentioned contents, what is needed is to develop an improved solution to solve the problem that photographers may have trouble in setting up streaming environment that provides multiple filming angles.

SUMMARY

An objective of the present invention is to disclose a device for immersive capture of streaming video and imaging and a method thereof, to solve the problem that photographers may have troubles in setting up streaming environment that provides multiple filming angles.

In order to achieve the object, the present invention provides a device for immersive capture of streaming video and imaging, and the device includes multiple image capturing units, a control unit and an imaging unit. The image capturing units includes a first image capturing unit and second image capturing units. The first image capturing unit is configured to capture a first detection image having a filming target, and capture a first target image having the filming target to generate a first image stream. Each of the second image capturing units is configured to capture the second target image in synchronization with the first image capturing unit, so that the second image capturing units generate second image streams. The control unit is configured to determine a distance parameter based on the first detection image, and configured to calculate a rotation angle corresponding to one of the second image capturing units based on the distance parameter and a unit distance between the one of the second image capturing units and the first image capturing unit, and control the one of the second image capturing units to rotate based on the rotation angle. The imaging unit is configured to generate a stream combination, wherein the stream combination comprises the first image stream and the second image streams.

In order to achieve the object, the present invention provides a method for immersive capture of streaming video and imaging, the method is applied to a device including a first image capturing unit and second image capturing units, and the method includes steps of: determining a distance parameter based on a first detection image captured by the first image capturing unit, wherein the first detection image has a filming target; calculating rotation angles of the second image capturing units based on the distance parameter, and unit distances between the second image capturing units and the first image capturing unit, respectively; controlling the second image capturing unit to rotate based on the rotation angles; generating a stream combination, wherein the stream combination comprises the first image stream and the second image streams, the first image stream is generated by the first target image having the filming target and captured by the first image capturing unit, and the second image streams generated by the second target images captured by the second image capturing units in synchronization with the first image capturing unit.

According to the above-mentioned device and method of the present invention, the difference between the present invention and the conventional technology is that in the present invention the distance parameter is determined based on the detection image captured by the first image capturing unit and having the filming target, the rotation angles of the second image capturing units are calculated based on the distance parameter and the unit distances between the second image capturing units and the first image capturing unit, respectively; after the second image capturing units are controlled to rotate based on the rotation angles respectively, the stream combination including the first image stream and the second image streams generated by the first image capturing unit and the second image capturing units in synchronization with each other can be generated. As a result, the technical effect of reducing complexity of setting up streaming environment that provides multiple filming angles and reducing trouble for installers can be achieved.

BRIEF DESCRIPTION OF THE DRAWINGS

The structure, operating principle and effects of the present invention will be described in detail by way of various embodiments which are illustrated in the accompanying drawings.

FIG. 1 is a system framework diagram of a device for immersive capture of streaming video and imaging, according to the present invention.

FIG. 2A is a schematic view of function blocks of a device for immersive capture of streaming video and imaging, according to the present invention.

FIGS. 2B and 2C are schematic views of image capturing units arranged in straight-line and arc, according to an embodiment of the present invention.

FIGS. 3A and 3B are schematic views of rotation angles of image capturing unit arranged in straight-line and arc, according to an embodiment of the present invention.

FIG. 4 is a schematic view of a frame of a stream combination, according to an embodiment of the present invention.

FIG. 5 is a flowchart of a method for immersive capture of streaming video and imaging, according to the present invention.

FIG. 6A~6C are schematic views of relative position of the first image capturing unit and the third image capturing unit in the device, according to an embodiment of the present invention.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

In the present invention, image capturing units of a device can be controlled to rotate toward a specific target, and controlled to generate synchronized image streams and combine the synchronized image streams generated by image capturing units to generate a stream combination. The device including the image capturing units can be a computing apparatus.

The computing apparatus mentioned in the present invention includes, but not limited to, one or more processing units, one or more memory modules, and a bus connected to hardware components (including memory modules and processing units). Through the above-mentioned hardware components, the computing apparatus can load and execute the operating system, so that the operating system can be executed on the computing apparatus, and can also execute software or programs. In addition, the computing apparatus also includes a housing, and the above-mentioned hardware components are arranged in the housing.

The bus of the computing apparatus mentioned in the present invention may be implemented by one or more types of bus; for example, the bus can include a data bus, an address bus, a control bus, an expansion bus or a local bus. The bus of computing apparatus can include, but not limited to, Industry Standard Architecture (ISA) bus, Peripheral Component Interconnect (PCI) bus, Video Electronics Standards Association (VESA) local bus, Universal Serial Bus (USB), PCI Express (PCI-E/PCIe) bus, etc.

The processing unit of the computing apparatus is coupled with the bus. The processing unit includes a register group or a register space. The register group or the register space can be completely set on the processing chip of the processing unit, or can be all or partially set outside the processing chip and is coupled to the processing chip through dedicated electrical connection and/or a bus. The processing unit can be a central processing unit, a microprocessor, or any suitable processing component. If the computing apparatus is a multi-processor apparatus, that is, the computing apparatus includes processing units, and the processing units can be all the same or similar, and coupled and communicated with each other through a bus. The processing unit can interpret a computer instruction or a series of multiple computer instructions to perform specific operations or operations, such as mathematical operations, logical operations, data comparison, data copy/moving, so as to drive other hardware component, execute the operating system, or execute various programs and/or module in the computing apparatus. The computer instruction may be an assembly instruction, an instruction set architecture (ISA) instruction, a machine instruction, a machine-related instruction, a microcode, a firmware instruction, or a source code or an object code written in any combination of two or more programming languages. And the computer instruction may be executed entirely on a single computing apparatus, partly on a single computing apparatus, or partly on one computing apparatus and partly on another connected computing device. The above-mentioned programming languages include object-oriented programming languages, such as Common Lisp, Python, C++, Objective-C, Smalltalk, Delphi, Java, Swift, C#, Perl, Ruby, etc., and conventional procedural programming languages, such as C language or other similar programming language.

The computing apparatus usually also includes one or more chipsets. The processing unit of the computing apparatus can be coupled to the chipset, or electrically connected to the chipset through the bus. The chipset includes one or more integrated circuits (IC) including a memory controller and a peripheral input/output (I/O) controllers, that is, the memory controller and the peripheral input/output controller can be implemented by one integrated circuit, or implemented by two or more integrated circuits. Chipsets usually provide I/O and memory management functions, and multiple general-purpose and/or dedicated-purpose registers, timers. The above-mentioned general-purpose and/or dedicated-purpose registers and timers can be coupled to or electrically connected to one or more processing units to the chipset for being accessed or used.

The processing unit of the computing apparatus can also access the data stored in the memory module and mass storage area installed on the computing apparatus through the memory controller. The above-mentioned memory modules include any type of volatile memory and/or non-volatile memory (NVRAM), such as Static Random Access Memory (SRAM), Dynamic Random Access Memory (DRAM), Read-Only Memory (ROM), or Flash memory. The above-mentioned mass storage area can include any type of storage device or storage medium, such as hard disk drives, optical discs, flash drives, memory cards, and solid state disks (SSD), or any other storage device. In other words, the memory controller can access data stored in static random access memory, dynamic random access memory, flash memory, hard disk drives, and solid state drives.

The processing unit of the computing apparatus can also connect and communicate with peripheral devices and interfaces including peripheral output devices, peripheral input devices, communication interfaces, or various data or signal receiving devices through the peripheral I/O controller and the peripheral I/O bus. The peripheral input device can be any type of input device, such as a keyboard, mouse, trackball, touchpad, or joystick. The peripheral output device can be any type of output device, such as a display, or a printer; the peripheral input device and the peripheral output device can also be the same device such as a touch screen. The communication interface can include a wireless communication interface and/or a wired communication interface. The wireless communication interface can include the interface capable of supporting wireless local area networks (such as Wi-Fi, Zigbee, etc.), Bluetooth, infrared, and near-field communication (NFC), 3G/4G/5G and other mobile communication network (cellular network) or other wireless data transmission protocol; the wired communication interface can be an Ethernet device, a DSL modem, a cable modem, an asynchronous transfer mode (ATM) devices, or optical fiber communication interfaces and/or components. The data or signal receiving device can include a GPS receiver or a physiological signal receiver, and physiological signal received by the physiological signal receiver includes but not limit to heartbeat, blood oxygen, etc. The processing unit can periodically poll various peripheral devices and interfaces, so that the computing apparatus can input and output data through various peripheral devices and interfaces, and can also communicate with another computing apparatus having the above-mentioned hardware components.

In an embodiment of the present invention, the image capturing units include a first image capturing unit and second image capturing units; in an embodiment, the image capturing units can additionally include a third image capturing unit. Generally, each of the first, second and third image capturing unit are cameras or video cameras, but the present invention is not limited to; the amount of the first image capturing unit and the third image capturing unit is one, and the amount of the second image capturing unit is multiple, but the present invention is not limited to above-mentioned example.

The operation of the present invention will be illustrated in the following paragraphs with reference to FIG. 1 and FIG. 2A, FIG. 1 is a system framework diagram of a device for immersive capture of streaming video and imaging, and FIG. 2A is a schematic view of function blocks of a device for immersive capture of streaming video and imaging, according to the present invention. As shown in FIG. 1, a device 100 includes a first image capturing unit 110, multiple second image capturing units 120, a control unit 150, an imaging unit 160, and a third image capturing unit 130, a communication unit 170 and a display unit 190. In an embodiment, the third image capturing unit 130, the communication unit 170 and the display unit 190 are optional. The device 100 is usually a hexahedron such as a cuboid, but the present invention is not limited to above-mentioned example. In particular, the control unit 150 and the imaging unit 160 can be one or more hardware modules (such as chips, electronic components or circuits) or can executes one computer instruction or a set of computer instructions, for realizing the present invention. The electronic components in the control unit 150 or the imaging unit 160 include but are not limited to complex programmable logic devices (CPLD), and the chips in the control unit 150 or the imaging unit 160 are, for example, application specific integrated circuits (ASIC), system on chip (SoC), field programmable gate array (FPGA), but the present invention is not limited thereto.

The first image capturing unit 110, the control unit 150 and the imaging unit 160 are electrically connected to each other, and a distance from the first image capturing unit 110 to the leftmost side of the housing of the device 100 is usually the same as or similar to a distance from the first image capturing unit 110 to the rightmost side of the housing of the device 100; in other words, the first image capturing unit 110 is usually disposed on a central axis 105 of the device 100 (as shown in FIG. 6A), but the present invention is not limited to above-mentioned example. In fact, the first image capturing unit can be placed anywhere in the device 100.

The first image capturing unit 110 is configured to capture a first detection image having a filming target 210. When receiving a detection signal transmitted from the control unit 150, the first image capturing unit 110 captures the first detection image. In general, the first image capturing unit 110 receives the detection signal every certain time period; in other words, the first image capturing unit 110 captures the first detection image every certain time period.

The first image capturing unit 110 also captures the target image having the filming target 210, and generates the image stream. In the present invention, the target image captured by the first image capturing unit 110 is also called a first target image, and the image stream generated by the first image capturing unit 110 is also called a first image stream. In more detail, the first image capturing unit 110 continuously captures the first target image, and generates the first image stream having the first target image based on a capturing sequence of the first target images, that is, the first image capturing unit 110 generates the first image stream using the first target images as frames in sequential order. When receiving the start signal transmitted from the control unit 150, the first image capturing unit 110 starts to continuously capture the first target images and generate the first image stream; when receiving a stop signal transmitted by the control unit 150, the first image capturing unit 110 stops capturing the first target image and completes the first image stream.

Each second image capturing unit 120 is electrically connected to the control unit 150 and the imaging unit 160, and is configured to capture the target image in synchronization with the first image capturing unit 110, and generate the image stream. In the present invention, the target image captured by the second image capturing unit 120 is also called a second target image, and the image stream generated by the second image capturing unit 120 is also called a second image stream. While the first image capturing unit 110 starts capturing the first target image, the second image capturing unit 120 starts continuously capturing the second target image, so as to generate the second image stream having the second target images based on a capturing sequence of the second target images, that is, each second image capturing unit 120 generates the second image stream using the second target images as frames in sequential order. When receiving the start signal transmitted from the control unit 150, the second image capturing unit 120 starts to continuously capture the second target images, to generate the second image streams, so as to capture the target image in synchronization with the first image capturing unit 110 and synchronously generate the image streams. When receiving the stop signal transmitted by the control unit 150, the second image capturing unit 120 stops capturing the second target image and completes the second image stream.

The third image capturing unit 130 is electrically connected to the control unit 150 and the imaging unit 160, and the third image capturing unit 130 is usually located adjacent to the first image capturing unit 110; that is, there usually is no image capturing unit located between the third image capturing unit 130 and the first image capturing unit 110, but the present invention is not limited to above-mentioned example. In an embodiment, as shown in FIG. 6C, a midpoint 107 on an interconnect 106 between the third image capturing unit 130 and the first image capturing unit 110 has the same or similar distances to the leftmost side 101*b* and the rightmost side 101*a* of the housing 101 of the device 100; that is, the first image capturing unit 110 and the third image capturing unit 130 are disposed on the two sides of the central axis 105 of the device 100, and the distance from the first image capturing unit 110 to the central axis 105 of the device 100 is the same as or similar to the distance from the third image capturing unit 130 to the central axis 105 of the device 100. In an embodiment, as shown in FIG. 6B, the first image capturing unit 110 is disposed on the central axis 105 of the device 100, the third image capturing unit 130 is disposed on a side of the first image capturing unit 110; that is, the third image capturing unit 130 can be disposed on any side of the central axis 105 of the device 100, but the present invention is not limited to above-mentioned example.

The third image capturing unit 130 captures a second detection image having the filming target 210. When receiving the detection signal transmitted from the control unit 150, the third image capturing unit 130 captures the second detection image. In general, the third image capturing unit 130 receives the detection signal and captures the third detection image every certain time period.

The third image capturing unit 130 captures the target image in synchronization with the first image capturing unit 110, to generate the image stream. In the present invention, the target image captured by the third image capturing unit 130 is also called a third target image, and the image stream generated by the third image capturing unit 130 is also called a third image stream. When the first image capturing unit 110 starts capturing the first target image, the third image capturing unit 130 starts continuously capturing the third target image, and generating the third image stream having the third target image based on a capturing sequence of the third target images; that is, the third image capturing unit 130 generates the third image stream using the third target images as frames in sequential order. When the third image capturing unit 130 receives the start signal transmitted from the control unit 150, the third image capturing unit 130 starts to continuously capture the third target image and generate the third image stream, so as to capture the target image and generate the image stream in synchronization with the first image capturing unit 110; when receiving the stop signal transmitted by the control unit 150, the third image capturing unit 130 stops capturing the third target image and completes the third image stream.

In general, each of the target images captured by the second image capturing unit 120 and the third image capturing unit 130 has the filming target 210; however, in an embodiment, the target images captured by the second image capturing unit 120 and the third image capturing unit 130 may not have the filming target 210, and the present invention is not particularly limited to the above-mentioned example.

It is to be noted that the image capturing units (that is, the first image capturing unit 110, the second image capturing units 120 and the third image capturing unit 130) of the present invention are arranged on the same plane; the image capturing units of the present invention can be in an straight-line or arc arrangement, as shown in FIGS. 2C and 2B; the image capturing units of the present invention can be arranged on two or more than two planes, and the image capturing units arranged on the same plane can be in an straight-line or arc arrangement.

The control unit 150 is electrically connected to the image capturing unit, and configured to generate one or more detection signals, one or more start signals, and one or more stop signals, and transmit the generated detection signals to the first image capturing unit 110 and the third image capturing unit 130, and transmit the generated start signals and stop signals to all of image capturing units. Wherein, the start signals (and the stop signals) transmitted to the image capturing unit can be the same or different. As long as the first image capturing unit 110, the second image capturing unit 120 and the third image capturing unit 130 can start and stop to capture the target image in synchronization, the start signals and the stop signals can be used in the present invention. Similar, the detection signals transmitted to the first image capturing unit 110 and the third image capturing unit 130 can be the same or different, too. The detection signals can be used in the present invention if the first image capturing unit 110 captures the first detection image and the third image capturing unit 130 captures the second detection image after receiving one of the detection signals.

In general, after the image capturing units do not generate image streams (that is, the device 100 is activated or the control unit 150 transmits the generated stop signal to the image capturing unit), the control unit 150 generates the detection signal every certain time period, and transmits the detection signal to the first image capturing unit 110 until the start signal is generated to make the image capturing unit synchronously generate the image streams, and the control unit 150 then stops generating the detection signal. In an embodiment where the device 100 includes the third image capturing unit 130, the control unit 150 transmits the detection signal to the first image capturing unit 110 and the third image capturing unit 130.

The control unit 150 determines the distance parameter based on the first detection image captured by the first image capturing unit 110. The distance parameter determined by the control unit 150 usually is a distance between the first image capturing unit 110 and the filming target 210, and the distance is also called target distance in the present invention; however, the present invention is not limited to above-mentioned example, for example, the distance parameter can be a focal length corresponding to the first image capturing unit 110, or the location information of lens group of the first image capturing unit 110 for capturing images.

The control unit 150 uses the first detection image to determine the distance parameter by conventional manner; for example, the control unit 150 can perform image recognition process (such as edge detection, pixel combination, feature capture, or feature matching in sequential order) on the first detection image, to identify a specific object (such as a human head, a human face, facial feature, button) in the first detection image; next, based on the identified size (or amount of pixels) of the specific object in the first detection image, the focal length of the first image capturing unit 110 capturing the first detection image, and a range of the real size of the specific object the pre-recorded, the control unit 150 uses the calculation formula of similar triangles (that is, focal length*real size of specific object/the size of the specific object in the first detection image) to calculate a possible range of the distance parameter. In an embodiment, the control unit 150 can control the first image capturing unit 110 to adjust the position of the lens group, to determine the distance parameter through Newton's method. However, in the present invention, the method of determining the distance parameter based on the first detection image is not limited to the above examples.

When the device 100 includes the third image capturing unit 130, the control unit 150 determines the distance parameter based on the first detection image and the second detection image captured by the first image capturing unit 110 and the third image capturing unit 130 synchronously. The control unit 150 can determine the distance parameter based on the first detection image and the second detection image by conventional manner such as triangular parallax method, but the present invention is not limited to above-mentioned examples.

The control unit 150 calculates a rotation angle corresponding to one of the second image capturing units 120 based on the determined distance parameter and a preset distance between the one of the second image capturing units 120 and the first image capturing unit 110, and controls the one of the second image capturing units to rotate based on the calculated rotation angle. The preset distance is also called an unit distance herein, and can be stored in storage medium of the device 100 in form of data in one or more files or in a database. The control unit 150 can query the corresponding unit distances between the first image capturing unit and each of the second image capturing units based on the unit identification data of the second image capturing units.

For example, as shown in FIGS. 3A and 3B, the distance parameter is a target distance 311 between the first image capturing unit 110 and the filming target 210, the control unit 150 calculates the rotation angle 331 of the second image capturing unit 121 through the trigonometric function based on the target distance 311, and the unit distance 321 between the first image capturing unit 110 and the second image capturing unit 121, that is, the rotation angle 331 is generated by formula, such as $\tan^{-1}$(the unit distance 321/the target distance 311); similarly, the rotation angles 332~334 of the second image capturing units 122~124 are generated and calculated based on the target distance 311 and the unit distances 322~324 between the first image capturing unit 110 and the second image capturing units 122~124, respectively.

The imaging unit 160 is electrically connected to the image capturing units and the communication unit 170, and configured to generate the stream combination having the image streams generated by the image capturing units synchronously, in other words, the stream combination generated by the imaging units 160 include the first image stream generated by the first image capturing unit 110, the second image stream generated by the second image capturing unit 120 in synchronization with the first image capturing unit 110. When the device 100 includes the third image capturing unit 130, the stream combination also includes the third image stream generated by the third image capturing unit 130 in synchronization with the first image capturing unit 110.

In more detail, the stream combination generated by the imaging unit 160 is an image stream having multiple frames, each frame of the stream combination includes multiple pixel blocks, and the size and amount of pixel blocks of the frame in the stream combination can be the same. As shown in FIG. 4, a frame 400 includes 25 pixel blocks. Each pixel block of the frame in the stream combination has a target image (in the present invention, the target image in the pixel block is also called screen image) captured by different image capturing unit, and different pixel blocks of each frame of the stream combination have target images captured by different image capturing units synchronously. In other words, the image streams generated by the image capturing units are synchronous with each other, the target images of the image streams generated by the image capturing units are synchronous with each other, so the imaging unit 160 can add the synchronous target images into different pixel blocks of the same frame of the stream combination, respectively.

In general, the position of the target image (the screen image) of the image stream in the frame of the stream combination is fixed; in other words, in the stream combination, the screen images in the pixel blocks of the frames arranged at the same position are the target images (frame) of the image stream generated by the same image capturing unit at different time points. For example, when the second target image captured by the second image capturing unit 124 is arranged at the pixel block 411 at upper leftmost corner of the frame 400, the second target image captured by the second image capturing unit 124 is constantly arranged at the pixel block 411 at the upper leftmost corner in all frames of the stream combination.

It should be noted that the position of pixel block corresponding to the target image of the image stream in the frame of the stream combination can be determined based on the capturing angle of the image stream; in other words, the imaging unit 160 can determine the position of the pixel block in the frame of the stream combination corresponding to the target image captured by the image capturing unit based on the relative position or the unit identification data of the image capturing unit in the device 100. For example, when the device 100 include 25 image capturing units which are, in the order from left to right, the second image capturing unit 124, the second image capturing unit 122, the first image capturing unit 110, the second image capturing unit 121, and the second image capturing unit 123 based on the positions of the image capturing units in the device 100, the second target image captured by the second image capturing unit 124 is arranged in the pixel block 411 at the upper leftmost corner of the frame 400 of the stream combination, the second target image of the image stream generated by the image capturing unit located at right side of and adjacent to the second image capturing unit 124 is arranged in the pixel block 412 at the second position from left side in the first row of the frame 400, the first target image captured by the first image capturing unit 110 is arranged in the pixel block 433 at the central position of the frame 400 of the stream combination, the second target image of the image stream generated by the image capturing unit arranged on the left side of and adjacent to the second image capturing unit 123 is arranged in the pixel block 454 at the second position from right in the last row of the frame 400, the second target image captured by the second image capturing unit 123 is arranged in the pixel block 455 at the bottom rightmost corner of the frame 400 of the stream combination.

The communication unit 170 is electrically connected to the imaging unit 160 and the display unit 190 and can be connected to an external device (such as the display device 250) through wired and/or wireless communication technology, to enable the device 100 to exchange data or signal with the external device, for example, the device 100 can transmit the stream combination generated by the imaging unit 160 to the display device 250 or receive the video streaming transmitted from the other communication device.

The display unit 190 is electrically connected to the communication unit 170, and configured to display the video streaming received by the communication unit 170.

The display device 250 is connected to the communication unit 170, and configured to receive the stream combination transmitted by the communication unit 170, and display the first image stream of the received stream combination, the second image stream of one or more specific second image capturing unit 120 and/or the third image stream. In an embodiment, the display device 250 can display the image stream.

The operation of the device and method of the present invention will be described in the following paragraphs with reference to an embodiment, and please refer to FIG. 5, which is a flowchart of a method for immersive capture of streaming video and imaging, according to the present invention.

In a step 510, after a user activates the device 100, the first image capturing unit 110 captures the first detection image having the filming target 210. In this embodiment, after the device 100 is activated, the control unit 150 generates a detection signal every certain time period, and the first image capturing unit 110 captures the first detection image every time the control unit 150 generates the detection signal.

In a step 520, after the first image capturing unit 110 captures the first detection image, the control unit 150 generates the distance parameter based on the first detection image captured by the first image capturing unit 110. In this embodiment, the distance parameter is a target distance, the control unit 150 determines the distance parameter based on Newton method, or determines a distance parameter by the manner of identifying a size of a specific object in the first detection image and comparing the size with a preset value.

In a step 530, after the control unit 150 generates the distance parameter, the control unit 150 calculates the rotation angles of the second image capturing units 120, based on the generated distance parameter and the unit distances of the second image capturing unit 120 and the first image capturing unit 110, respectively. In a step 540, the control unit 150 controls the second image capturing units 120 to rotate based on the calculated rotation angles of the second image capturing unit 120. In this embodiment, the control unit 150 calculates the rotation angles of the second image capturing units 120 through the trigonometric function, such as tan-(unit distance/distance parameter), and controls the second image capturing units 120 to rotate toward the filming target 210 by the rotation angles. As shown in FIG. 3, the control unit 150 first calculates the rotation angle of the second image capturing unit 124 and controls the second image capturing unit 124 to rotate by the calculated rotation angle counterclockwise; next, the control unit 150 calculates the rotation angle of the second image capturing unit 122 and controls the second image capturing unit 122 to rotate by the rotation angle counterclockwise; the control unit 150 calculates the rotation angles of the second image capturing units 121/123 and controls the second image capturing units 121/123 to rotate by the rotation angles in the clockwise direction.

In a step 550, after the control unit 150 controls the second image capturing unit to rotate toward the filming target 210, the first image capturing unit 110 captures the first target image having the filming target 210 to generate the first image stream including the first target image, the second image capturing unit 120 captures the second target image in synchronization with the first image capturing unit 110, to generate the second image stream having the second target image. In this embodiment, the control unit 150 generates the start signal; when the control unit 150 generates the start signal, the first image capturing unit 110 and the second image capturing units 120 synchronously start to capture the target images to generate the first image stream and the second image streams that are synchronous with each other.

In a step 560, after the image capturing units synchronously capture the target images and generate the synchronous image streams, the imaging unit 160 generates the stream combination including the image streams synchronously generated by the image capturing units. In this embodiment, the imaging unit 160 determines the arrangement sequence of the synchronous target images of the first image stream and the second image streams based on the arrangement positions (or relative positions) of the image capturing units in the device 100 or the unit identification data of the image capturing units, and the imaging unit 160 adds the synchronous target images of the first image stream and the second image streams into the different pixel blocks of the same frame one by one in sequential order, so as to generate the stream combination having the image streams generated by the image capturing units synchronously.

As a result, the above-mentioned solution of the present invention can use a device to obtain the target images of the user by different angles at the same time for sequential use, for example, the target image can be stored as streaming media file to be broadcasted, or transmitted to an external device for display.

For example, in above embodiment where the device 100 includes the communication unit 170, in a step 570, after the imaging unit 160 generates the stream combination (the step 560), the communication unit 170 transmits the stream combination generated by the imaging unit 160 to the display device 250, the display device 250 displays the one or more image stream(s) of the stream combination. For example, the display device 250 reads the target image at different pixel block of each frame of the stream combination every time period in sequential order, and displays the read target image to play different image stream by turns; the display device 250 can directly display the stream combination, so that the displayed screen can show images of the user by different filming angles at the same time. The display device 250 reads the target image in each pixel block of the frame of the stream combination, and displays the read target image in corresponding pixel block to show the image streams by different viewing angle corresponding to filming angle of the image stream.

According to above-mentioned contents, the difference between the present invention and the conventional technology is that in the present invention the distance parameter is determined based on the detection image captured by the first image capturing unit and having the filming target, the rotation angles of the second image capturing units are calculated based on the distance parameter and the unit distances between the second image capturing units and the first image capturing unit, respectively; after the second image capturing units are controlled to rotate based on the rotation angles respectively, the stream combination including the first image stream and the second image streams generated by the first image capturing unit and the second image capturing units in synchronization with each other can be generated. As a result, the technical solution of the present invention is able to solve the problem that photographers may have troubles in setting up streaming environment that provides multiple filming angles, so as to achieve the technical effect of reducing complexity of setting up streaming environment that provides multiple filming angles and reducing trouble for installers.

Furthermore, the method for immersive capture of streaming video and imaging of the present invention can be implemented by hardware, software or a combination thereof, and can be implemented in a computer system by a centralization manner, or by a distribution manner of different components distributed in several interconnect computer systems.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A device for immersive capture of streaming video and imaging, comprising:
   multiple image capturing units arranged the same plane or multiple planes in the device, and the image capturing units arranged the same plane are in a straight-line or arc arrangement, comprises
      a first image capturing unit configured to capture a first detection image having a filming target, and capture a first target image having the filming target to generate a first image stream; and
      second image capturing units, wherein each of the second image capturing units is configured to capture the second target image in synchronization with the first image capturing unit, so that the second image capturing units generate second image streams;
   a control unit configured to determine a distance parameter based on the first detection image, and configured to calculate a rotation angle corresponding to each of the second image capturing units based on the distance parameter and a respective preset unit distance between each of the second image capturing units and the first image capturing unit, and control the one of the second image capturing units to rotate based on the rotation angle; and
   an imaging unit configured to generate a stream combination, wherein the stream combination comprises the first image stream and the second image streams and the first target image of the first image stream and the second target image of each of the second image streams are added into different pixel blocks of same frame of the stream combination.

2. The device for immersive capture of streaming video and imaging according to claim 1, wherein the image capturing units comprises a third image capturing unit configured to capture a second detection image having the filming target in synchronization with the first image capturing unit, and capture a third target image to generate a third image stream in synchronization with the first image capturing unit, the control unit determines the distance parameter based on the first detection image and the second detection image that are synchronized with each other by triangular parallax method.

3. The device for immersive capture of streaming video and imaging according to claim 2, wherein the first image capturing unit is disposed on a central axis of the device, the third image capturing unit is disposed on a side of the first image capturing unit near the central axis, and no image capturing unit located between the first image capturing unit and the third image capturing unit.

4. The device for immersive capture of streaming video and imaging according to claim 2, wherein the first image capturing unit and the third image capturing unit are disposed on both side of a central axis of the device, and no image capturing unit located between the first image capturing unit and the third image capturing unit.

5. The device for immersive capture of streaming video and imaging according to claim 1, wherein the control unit performs image recognition process on the first detection image to identify a specific object in the first detection image, and uses the calculation formula of similar triangles to calculate the distance parameter based on identified size or amount of pixels of the specific object in the first detection image, focal length of the first image capturing unit capturing the first detection image and real size of the specific object.

6. The device for immersive capture of streaming video and imaging according to claim 1, wherein the control unit controls the first image capturing unit to adjust position of lens group of the first image capturing unit, to determine the distance parameter through Newton's method.

7. The device for immersive capture of streaming video and imaging according to claim 1, wherein the device is connected to a display device, the display device is configured to receive the stream combination and display at least one of the first image stream and the second image streams.

8. The device for immersive capture of streaming video and imaging according to claim 1, wherein the device comprises a communication unit and a display unit, the communication unit is configured to receive a video streaming, and the display unit is configured to display the video streaming.

9. The device for immersive capture of streaming video and imaging according to claim 1, wherein the imaging unit determines positions of the first image stream and the second image streams in the stream combination based on the arrangement positions of the image capturing units in the device or unit identification data of the image capturing units.

10. A method for immersive capture of streaming video and imaging, applied to a device, wherein the device comprises a first image capturing unit and second image capturing units, the first image capturing unit and the second image capturing units are arranged the same plane or multiple planes in the device, and the first image capturing unit and the second image capturing units arranged the same plane are in a straight-line or arc arrangement, the method comprises:

determining a distance parameter based on a first detection image captured by the first image capturing unit by the device, wherein the first detection image has a filming target;

calculating rotation angle corresponding to each of the second image capturing units based on the distance parameter and a respective preset unit distance between each of the second image capturing units and the first image capturing unit, by the device;

controlling the second image capturing unit to rotate based on the rotation angles by the device; and generating a stream combination by the device, wherein the stream combination comprises the first image stream and the second image streams and the first target image of the first image stream and the second target image of each of the second image streams are added into different pixel blocks of same frame of the stream combination, the first image stream is generated by the first target image having the filming target and captured by the first image capturing unit, and the second image streams generated by the second target images captured by the second image capturing units in synchronization with the first image capturing unit.

11. The method for immersive capture of streaming video and imaging according to claim 10, wherein the step of determining the distance parameter based on the first target image captured by the first image capturing unit and having the filming target comprises:

using triangular parallax method to determine the distance parameter based on the first target image and the second detection images which are captured by a third image capturing unit in synchronization with the first target image, by the device.

12. The method for immersive capture of streaming video and imaging according to claim 10, wherein the step of determining the distance parameter based on the first detection image by the device comprises:

performing image recognition process on the first detection image by the device to identify a specific object in the first detection image; and using the calculation formula of similar triangles to calculate the distance parameter, by the device, based on identified size or amount of pixels of the specific object in the first detection image, focal length of the first image capturing unit capturing the first detection image and real size of the specific object.

13. The method for immersive capture of streaming video and imaging according to claim 10, wherein the step of determining the distance parameter based on the first detection image by the device comprises:

controlling the first image capturing unit to adjust position of lens group of the first image capturing unit, by the device, to determine the distance parameter through Newton's method.

14. The method for immersive capture of streaming video and imaging according to claim 10, wherein the step of generating the stream combination comprises:

determining positions of the first image stream and the second image streams in the stream combination, by the device, based on arrangement positions of the first image capturing unit and the second image capturing units in the device or unit identification data of the first image capturing unit and the second image capturing units.

15. The method for immersive capture of streaming video and imaging according to claim 10, further comprising:

transmitting the stream combination to a display device by the device, to make the display device display at least one of the first image stream and the second image streams.

\* \* \* \* \*